US008238312B2

United States Patent
Gandham et al.

(10) Patent No.: US 8,238,312 B2
(45) Date of Patent: Aug. 7, 2012

(54) HETEROGENEOUS BACK-OFF MECHANISM TO DECREASE LATENCY IN MOBILE IP TELEPHONY

(75) Inventors: Shashidhar R. Gandham, Sunrise, FL (US); Alireza Keshavarz Haddad, Lauderhill, FL (US)

(73) Assignee: XG Technology, Inc., Sarasota, FL (US)

( * ) Notice: Subject to any disclaimer, the term of this patent is extended or adjusted under 35 U.S.C. 154(b) by 506 days.

(21) Appl. No.: 12/590,472

(22) Filed: Nov. 9, 2009

(65) Prior Publication Data

US 2010/0118838 A1  May 13, 2010

Related U.S. Application Data

(60) Provisional application No. 61/198,782, filed on Nov. 10, 2008.

(51) Int. Cl.
*H04J 3/00* (2006.01)
*H04L 12/413* (2006.01)
(52) U.S. Cl. ........................................ 370/336; 370/445
(58) Field of Classification Search .................. 370/336, 370/445
See application file for complete search history.

(56) References Cited

U.S. PATENT DOCUMENTS

| 2004/0218620 | A1* | 11/2004 | Palm et al. | 370/445 |
|---|---|---|---|---|
| 2005/0220131 | A1* | 10/2005 | Ginzburg et al. | 370/432 |
| 2006/0029073 | A1* | 2/2006 | Cervello et al. | 370/389 |
| 2008/0112370 | A1 | 5/2008 | Kwon | |
| 2008/0171550 | A1* | 7/2008 | Zhao | 455/445 |
| 2008/0192708 | A1* | 8/2008 | Gandham | 370/336 |
| 2008/0205373 | A1* | 8/2008 | Gandham | 370/347 |
| 2009/0213815 | A1* | 8/2009 | Sherman et al. | 370/336 |

FOREIGN PATENT DOCUMENTS

WO  WO 2008097628 A2 *  8/2008

\* cited by examiner

*Primary Examiner* — Kenny Lin
(74) *Attorney, Agent, or Firm* — Dennis L. Cook, Esq.

(57) ABSTRACT

A heterogeneous back-off algorithm wherein latency-intolerant messages follow a linear back-off and other messages follow an exponential back-off protocol is disclosed. Typically exponential back-off techniques are used to schedule retransmissions to increase the probability of successful transmission in temporally high contention scenarios. However, exponential back-off can create an exponential increase in the transmit latency. For transmitting latency-intolerant messages like handoff messages large latency is not acceptable therefore a heterogeneous back-off algorithm using both back-off protocols is proposed.

1 Claim, 9 Drawing Sheets

Basic super-frame structure.

Basic super-frame structure.

Success rate and average delay of exponential back-off protocol in xMAX system.

Figure 3
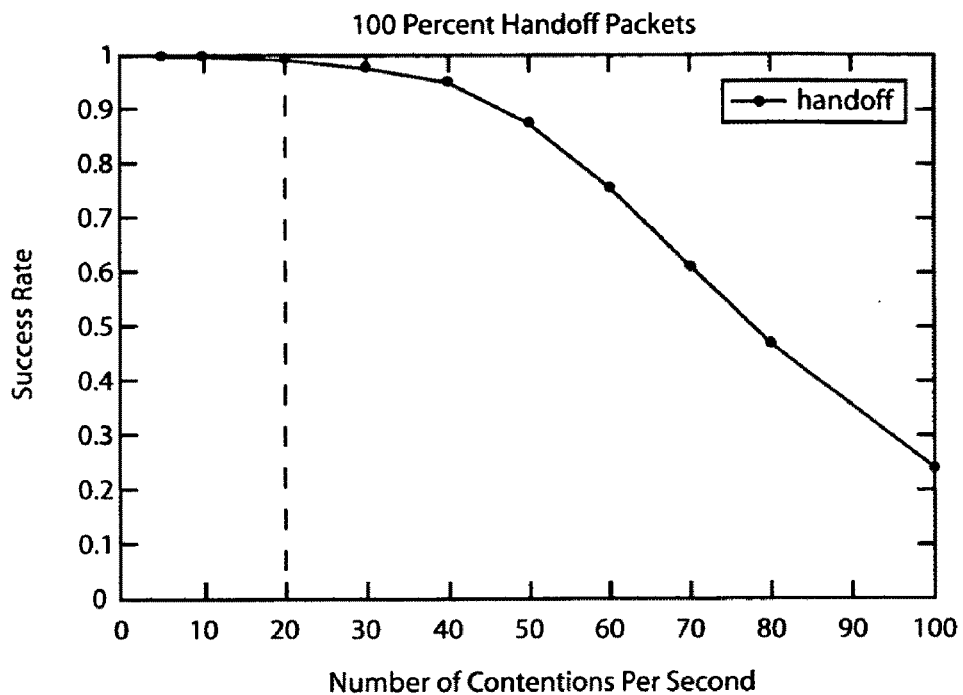
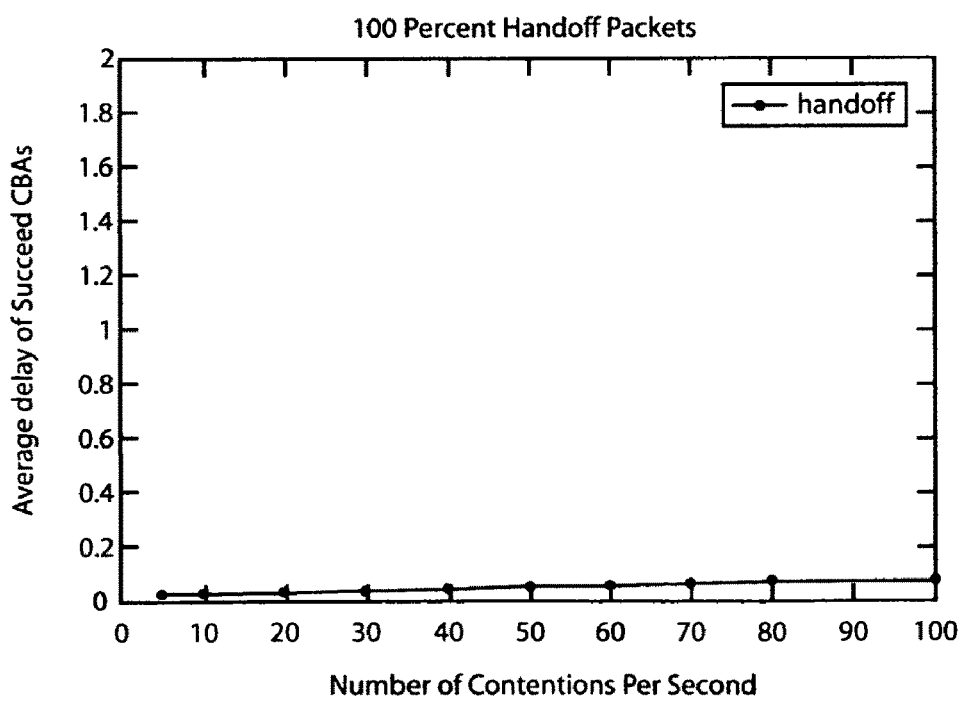
Success rate and average delay of linear back-off protocol in xMAX system.

Success rate and average delay of CBAs when half of CBAs (handoffs) use linear back-off and the rest (non-handoffs) use exponential back-off.

Figure 5
(a)
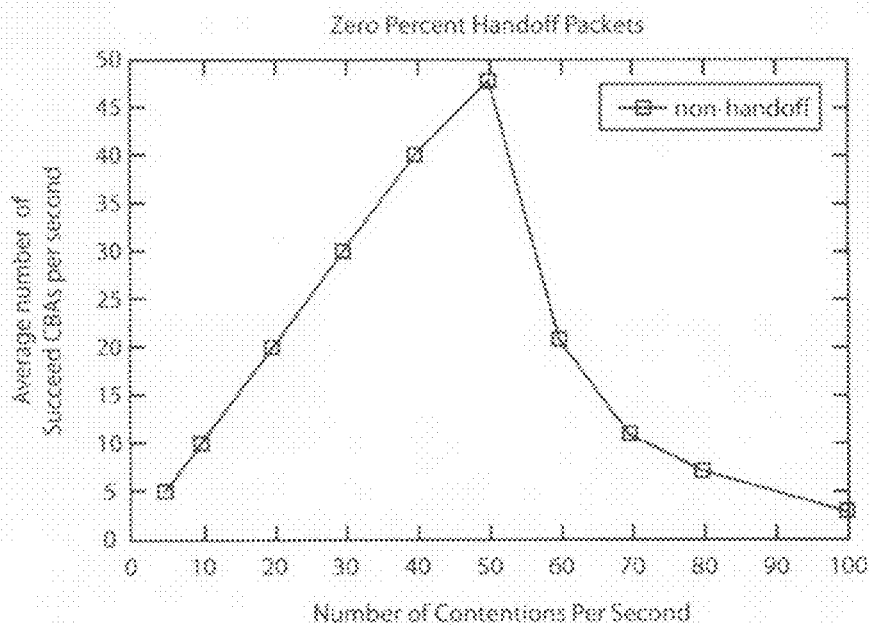
Zero Percent Handoff Packets
(b)
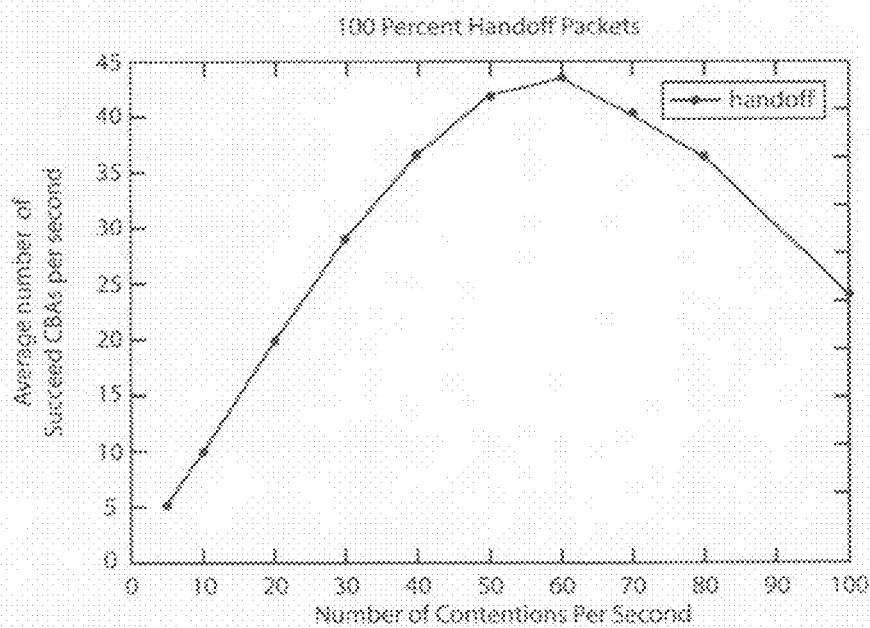
100 Percent Handoff Packets
Utilization of exponential and linear back-off protocols for different scenarios.

Utilization of exponential and linear back-off protocols for different scenarios.

Figure 6
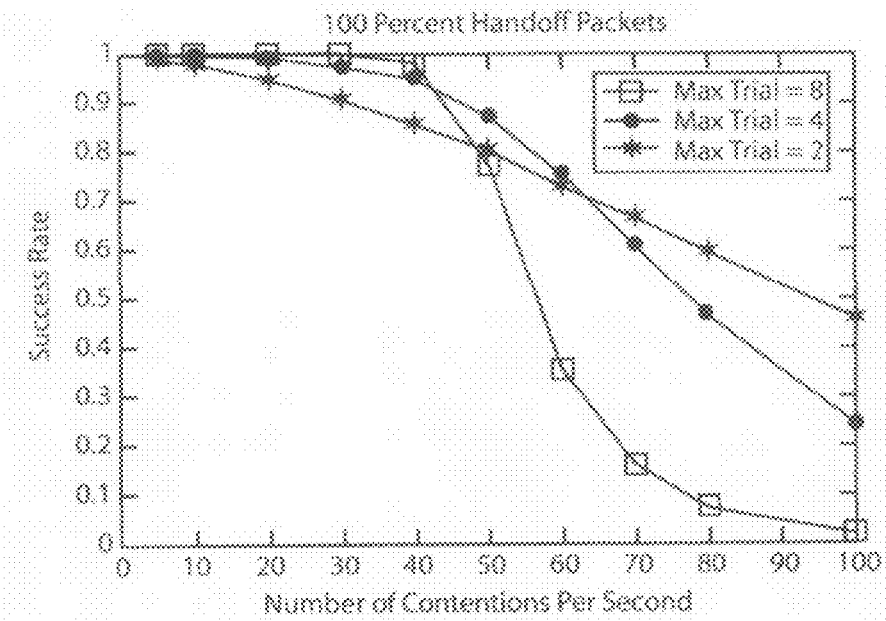
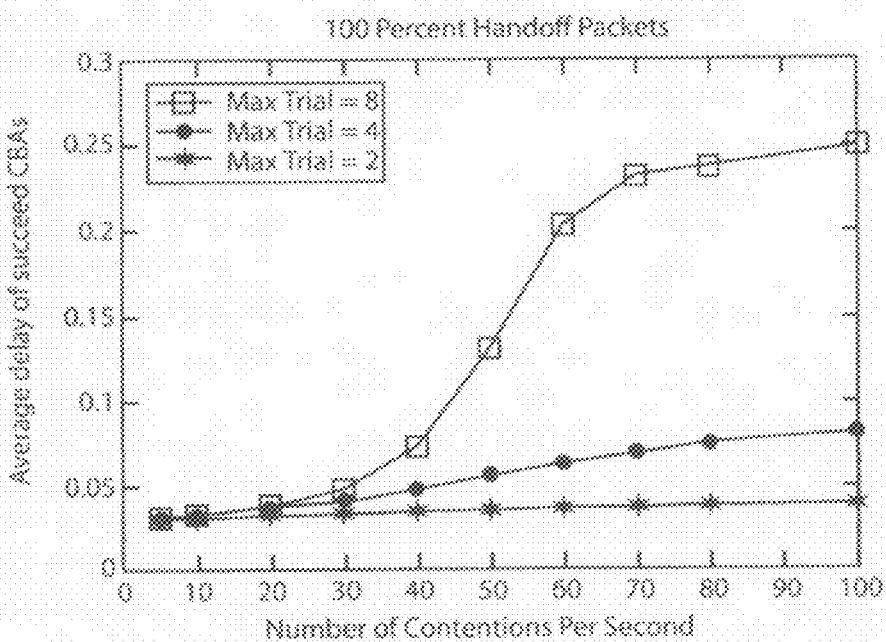
Success rate and average delay of linear back-off protocol in xMAX system for different Maximum number of trials.

Figure 7
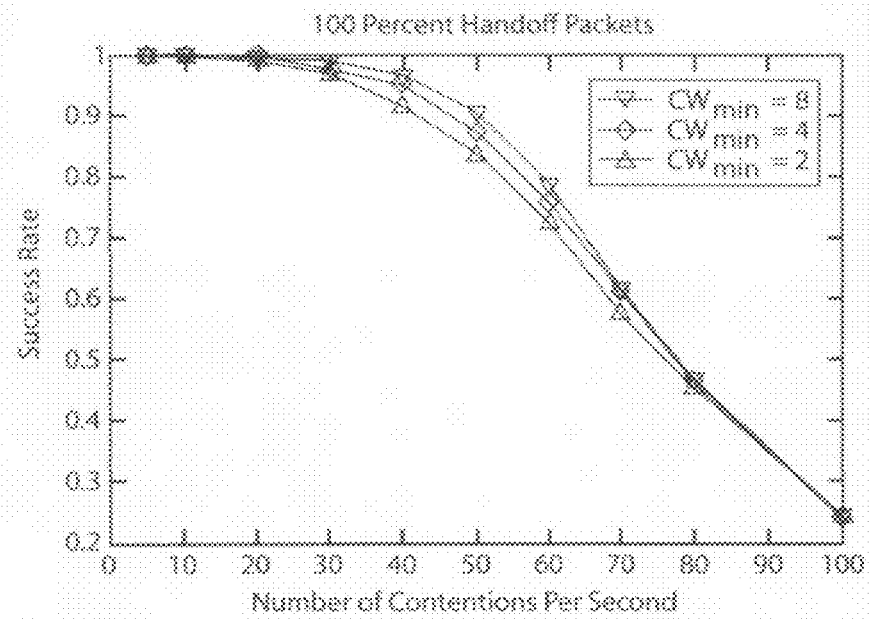
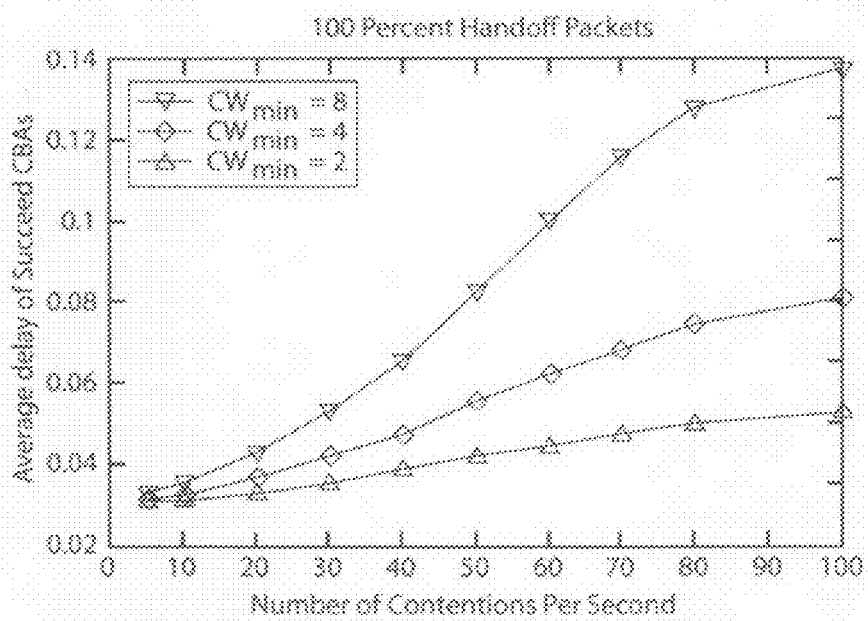
Success rate and average delay of linear back-off protocol in xMAX system for different minimum Contention Window size.

Figure 8
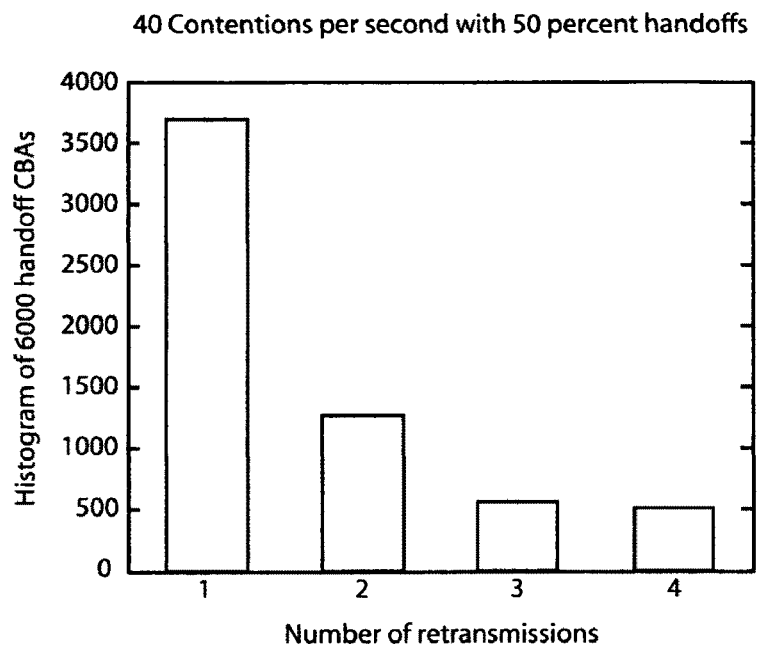
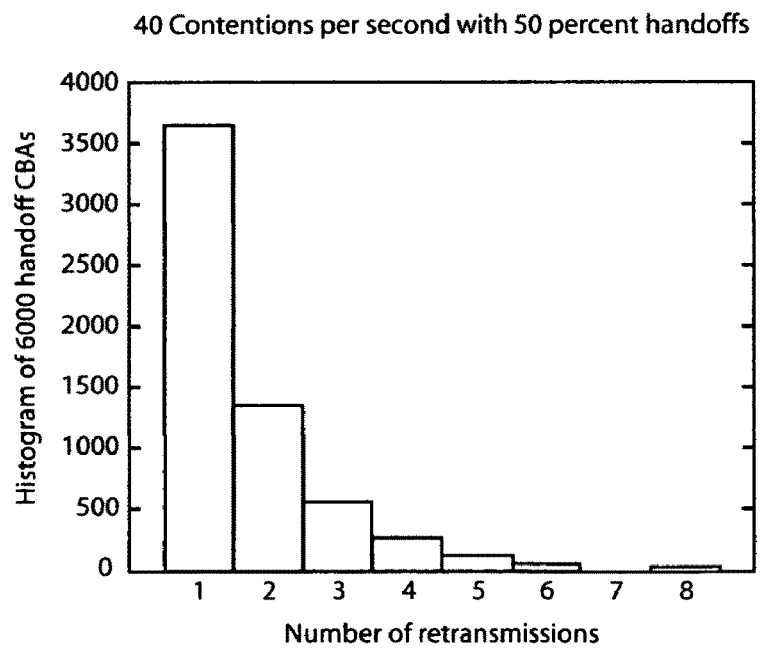
Histogram of the number of transmissions for handoff and non-handoff CBAs at 40 CBA requests saturation point.

HETEROGENEOUS BACK-OFF MECHANISM TO DECREASE LATENCY IN MOBILE IP TELEPHONY

CROSS-REFERENCE TO RELATED APPLICATION

The present application claims the benefit of previously filed co-pending Provisional Patent Application Ser. No. 61/198,782.

FIELD OF THE INVENTION

This invention addresses the need to transport high bit-rate data and voice to multiple users over wired and wireless means. Typically exponential back-off techniques are used to schedule retransmissions to increase the probability of successful transmission in temporally high contention scenarios. However, exponential back-off can create an exponential increase in the transmit latency. For transmitting latency-intolerant messages like handoff messages large latency is not acceptable. Specifically, this disclosure describes a heterogeneous back-off algorithm wherein latency-intolerant messages follow a linear back-off and other messages follow an exponential back-off protocol.

BACKGROUND OF THE INVENTION

The invention disclosed in this application uses any integer cycle or impulse type modulation and more particularly is designed to work with a method of modulation now known by its commercial designation, xMax. This new wireless physical layer technology developed by xG Technology Inc., referred to as xMAX, enables extremely low power omni-directional transmissions to be received in a wide area. Using xMAX, significant bandwidth can be made available for supporting various wireless applications. Voice Over IP (VoIP) based cellular services are now being developed using xMAX. In xMAX-based cellular networks both the base station and the handsets will be equipped with an xMAX transceiver. A mobile device (xMAX handset) in such a network will be free to move in an area covered by multiple xMAX base stations. Although this heterogeneous back-off algorithm wherein latency-intolerant messages follow a linear back-off and other messages follow an exponential back-off protocol is disclosed in the preferred embodiment as being used in these types of integer cycle and pulse modulation systems it can be implemented on any of the broad band wireless technologies like WiMax, WiBro, WiFi, 3GPP and HSDPA, or any other type of wired or wireless voice or data systems.

A heterogeneous MAC protocol proposed to support VOIP traffic in xMAX wireless networks has been discussed in previously filed patent applications U.S. Ser. Nos. 12/069, 057; 12/070,815; 12/380,698; 12/384,546; 12/386,648; 12,387,811; 12/387,807, 12/456,758, 12/456,725, 12/460, 497, 12/583,627, and 12/583,644 which are incorporated by reference into this disclosure. In the heterogeneous MAC protocol described in these applications, guaranteed timeslots are assigned to forward VOIP packets, temporary timeslots are assigned to forward data packets and contention based access is used to exchange control messages. Note that this heterogeneous MAC protocol is used here as a reference protocol and similarly xMAX as a reference wireless network. The idea of a heterogeneous back-off algorithm wherein latency-intolerant messages follow a linear back-off and other messages follow an exponential back-off protocol as described herein can be used in other relevant systems.

BRIEF SUMMARY OF THE INVENTION

The invention disclosed in this application was developed for and is described in the preferred embodiment as being used in any integer cycle or impulse type modulation and more particularly a method of modulation known by its commercial designation, xMAX, but can be implemented on WiFi, 3GPP, HSDPA or any other type of wired or wireless voice or data systems.

Contention-based access is used for sending signaling messages in cellular systems like xMAX. It is known that contention results in collision whenever multiple nodes transmissions overlap in time. Typically exponential back-off techniques are used to schedule retransmissions to increase the probability of successful transmission in temporally high contention scenarios. However, exponential back-off can create an exponential increase in the transmit latency. For transmitting latency-intolerant messages like handoff messages large latency is not acceptable. A heterogeneous back-off algorithm wherein latency-intolerant messages follow a linear back-off and other messages follow an exponential back-off protocol is disclosed in this application and, the performance of this approach is shown through simulations that identify a set of optimal configuration parameters.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which:

FIG. 3 is a diagram showing the success rate and average delay of linear back-off protocol;

FIG. 6 is a diagram showing the success rate and average delay of linear back-off protocol in different maximum number of trials;

FIG. 7 is a diagram showing the success rate and average delay of linear back-off protocol in different minimum contention window sizes; and, FIG. 8 is a histogram of the number of transmissions for handoff and non-handoff CBA's at 40 CBA requests saturation point.

DETAILED DESCRIPTION OF THE INVENTION

Figure 1:
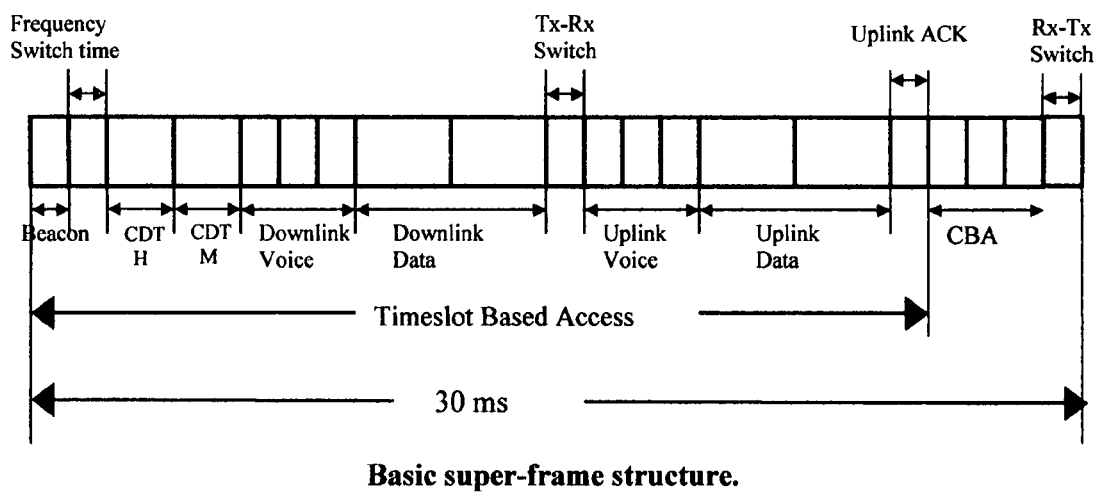
FIG. 1 is a diagram showing a basic super-frame structure.

The invention disclosed in this document is applicable to all cellular systems in general and VoIP-based cellular networks in particular. In this disclosure xMAX is used as an example of such VOIP-based cellular networks. A heterogeneous MAC protocol is the medium access control protocol used in xMAX networks. In a heterogeneous MAC protocol the time domain is sliced into equal intervals of time referred to as a super-frame as shown in FIG. 1. Each super-frame consists of a Timeslot Based Access (TBA) period and a Contention Based Access (CBA) period. For a detailed explanation of the super-frame structure please refer to the patent applications listed above which are incorporated by reference into this disclosure. TBA is employed for supporting mobile VoIP calls and data sessions by modems. CBA is used for sending a heterogeneous MAC protocol control messages to the base-stations. Typical heterogeneous MAC protocol control messages include network join, connection establish, network leave and hand-off messages. Network join messages are sent every time a handset is powered-on or enters a new dealer's network when not in a voice call. Connection-establish messages are used to initiate calls. Hand-off messages are used when a mobile is in a voice call and moving to a new cell.

To send a message in CBA a node randomly selects a timeslot from a window and schedules its transmission. If there is a collision the node retries up to a pre-determined maximum number of times. During each retry attempt it increases the window size from which it selects a timeslot.

A well known mechanism for increasing the window size is the exponential back-off method. In this method the size of contention window doubles after each retransmission. Doubling the window size is necessary for the stability of the back-off protocol as the number of contentions increases in the system. However note that in practice packets cannot tolerate very large transmission latency. Therefore two other mechanisms are supplemented to the exponential back-off protocol: (i) Window size truncation mechanism: after a certain number of window size increases, the doubling stops and the windows size does not increase any further; and, (ii) Timeout mechanism: the packet is dropped after a certain number of retries.

The following parameters are used in the current heterogeneous MAC protocol design for exponential back-off protocol: minimum contention window size=8, maximum contention window size=256, and maximum number of trials=8. In this design there are 4 CBA timeslots in each super-frame for the simulation study.

As a brief review of the exponential back-off protocol: the contention window size is set equal to the minimum contention windows size (8) for the first transmission trial. The contention window size is doubled after each unsuccessful transmission. If the windows size rises to 256, then it will be kept the same for the rest of trials. The retransmission process will be stopped and the packet is dropped after 8 unsuccessful trials.

Figure 2:
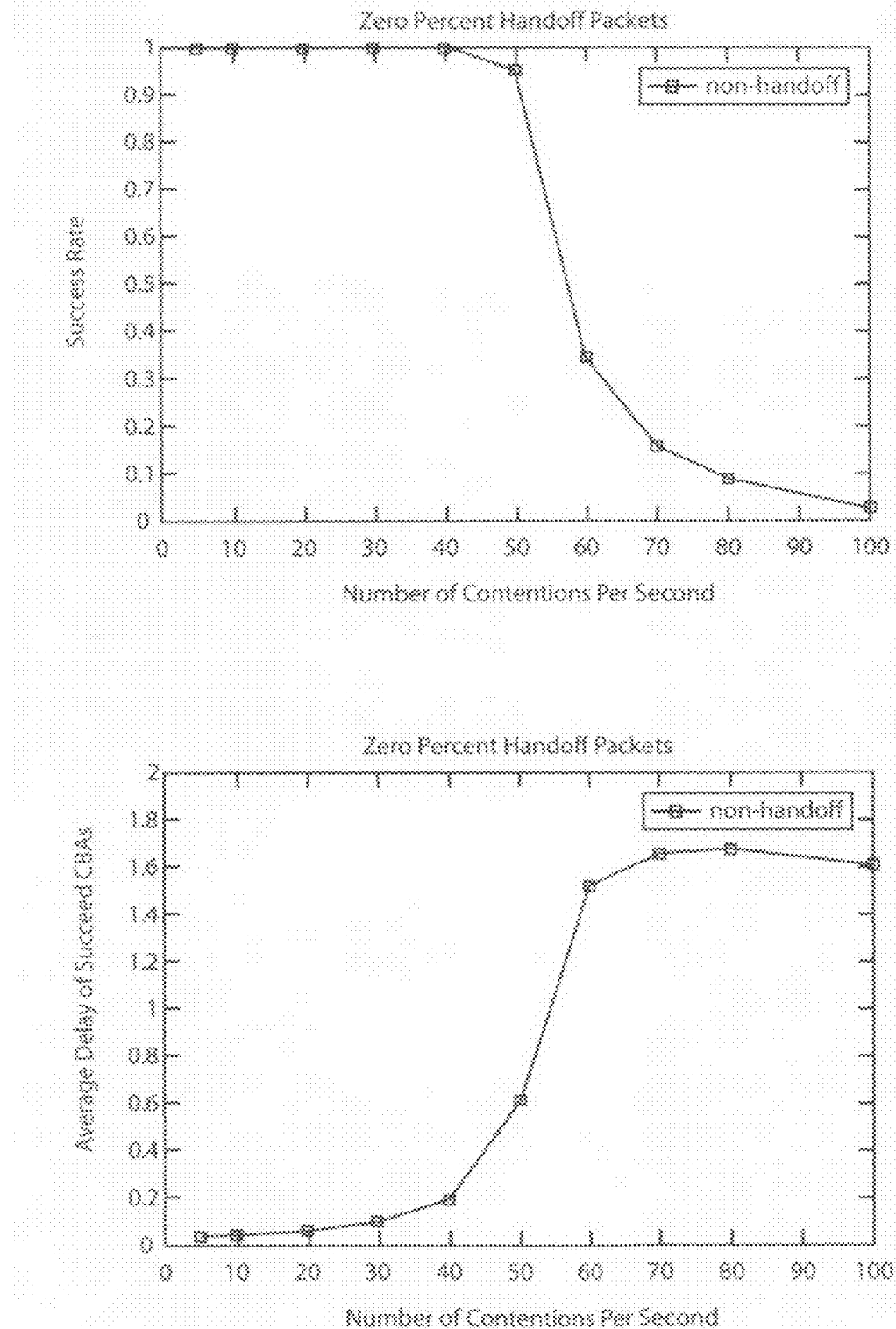
FIG. 2 is a diagram showing the success rate and average delay of exponential back-off protocol.

FIG. 2 depicts the performance of an exponential back-off protocol. The results show that the current xMAX system is saturated with about 50 CBA requests per second if exponential back-off is employed in a heterogeneous MAC protocol. Beyond this point, the success rate drops abruptly to 30%, also the average delay of succeed CBA shoots up to 1.5 seconds.

Note that the average delay of the protocol is relatively large for delivering handoff CBAs when the number of CBA requests goes beyond 20 requests in one second. This shows the necessity for designing a new back-off protocol for handoff CBAs that provides smaller transmission latency.

In this disclosure the performance of a linear back-off protocol for handling handoff CBAs in xMAX cellular networks is shown. The performance of this protocol along with the existing exponential back-off protocol is analyzed and compared. Then a heterogeneous back-off protocol for xMAX networks which uses both exponential and linear back-off mechanism depending on the type of CBAs request is disclosed. Analysis of the protocol is conducted and simulation results are provided on its performance in an xMAX system.

The retransmission algorithm of linear back-off protocol is as follows. The algorithm includes two configuration parameters: minimum contention window size (CW_min); and, maximum number of trials (Max_trial).

In the first CBA trial, the contention window size is set equal to CW_min. This means that the handset randomly selects an integer $x\_1$ in $[0, CWmin\_1]$ interval and waits for $x\_1$ CBA slots, and then it transmits its packet.

For $1<k<=Max\_trial$, if $(k-1)$'th transmission is unsuccessful, the window size is increased by CW_min, i.e., the handset randomly selects an integer $x\_k$ in $[0, k*CW\_min-1]$ interval, waits for $x\_k$ CBA slots, and then transmits.

If the handset experiences Max_trial unsuccessful transmissions for a packet then it drops the packet and stops retransmitting.

The performance of linear back-off protocols for delivering handoff CBA requests in xMAX cellular network is as follows. Consider the following configuration parameters for linear back-off protocols: CW_min=4 and Max_trial=4.

FIG. 3 shows the performance of the linear back-off protocol assuming that all CBA requests are handoffs. Note that all the CBA messages are delivered when the number of requests is less than 20 per second. The results reveal that the success rate decreases swiftly as the number of CBA requests grows to more than 40 per second. However, a sharp saturation point similar to the exponential back-off case is not observed. Note that the average delay of succeed CBAs remains small, even beyond the saturation point, because, the protocol uses linear back-off and also the configuration parameters (i.e. the minimum windows size and the maximum number of trials) are chosen relatively small.

The simulation results imply that exponential back-off protocol has a better success rate than the linear back-off protocol when the number of CBAs per-second is less than 50. Above this value the linear back-off protocol has a better success rate since it uses less number of retransmissions for each packet. Moreover, in the linear back-off approach the latency increases linearly. Thus, a heterogeneous back-off mechanism that uses linear back-off for only handoff CBAs and exponential back-off for non-handoff CBAs is discussed.

Figure 4:
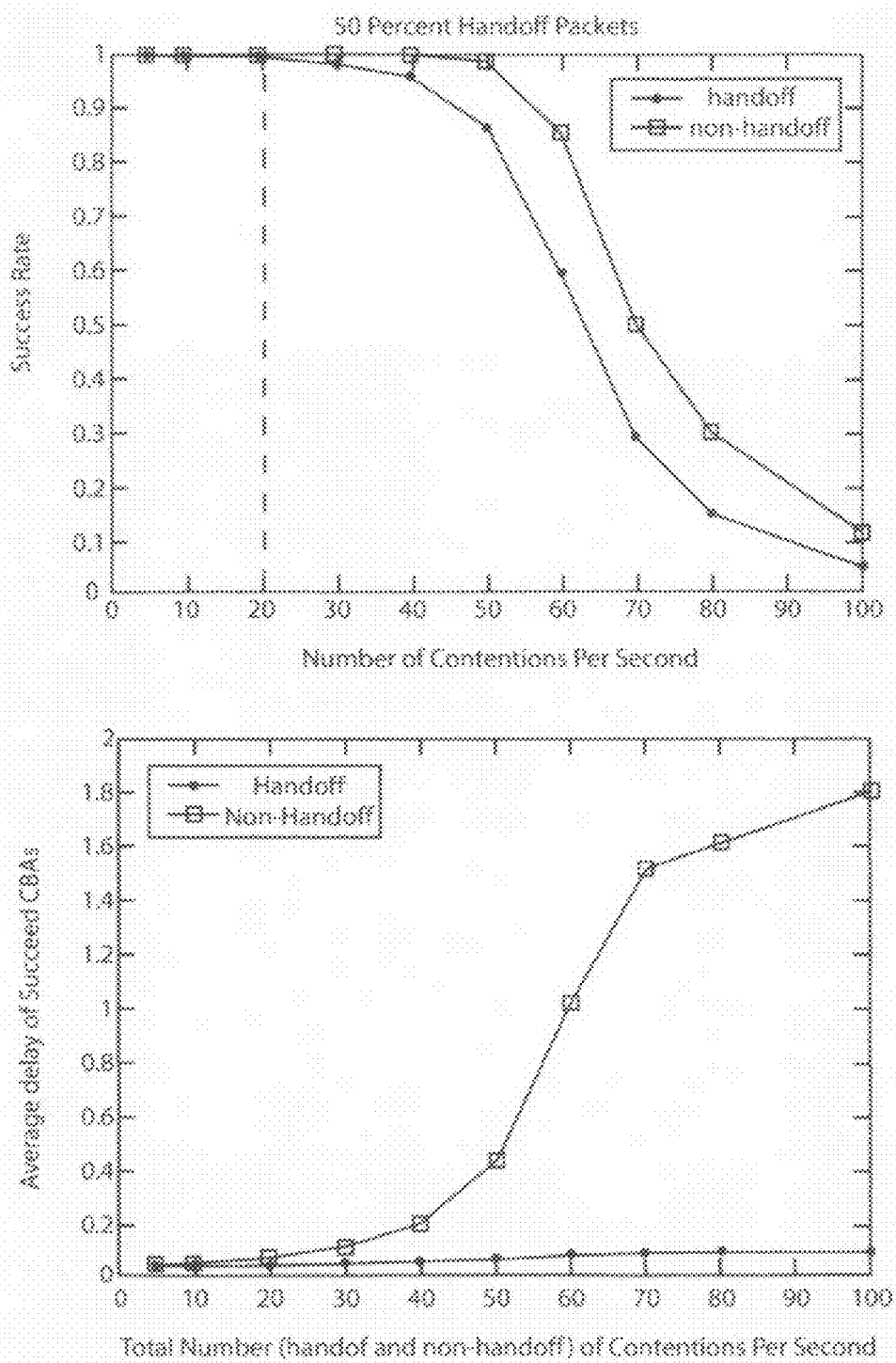
FIG. 4 is a diagram showing the success rate and average delay of a combination linear and exponential back-off protocol.

Different scenarios are now shown of the heterogeneous back-off protocol by varying the fraction of CBAs which are handoffs (i.e. 25%, 50%, 75%). In FIG. 4 the success rate and average delay of handoff and non-handoff CBAs for the scenario when 50% of CBAs are handoffs is shown. Note that when the number of CBA messages per second is less than 20 then all the messages are delivered and the average latency of handoff messages is about 0.05 seconds.

The results indicate that non-handoff packets have a better success rate, however, their delay is very large beyond the saturation point. On the other hand, handoff CBAs have a smaller success rate but are good enough for delivering the maximum number of handoff CBAs (20) and their average delay always remains very small. Similar results also hold for the cases where the fraction of handoff CBAs is 25% and 75%.

Next the performance of linear and exponential back-off protocols in the xMAX system is analyzed. These protocols operate in the xMAX system based on the random selection of time slots (CBA slots) in similar way to slotted-ALOHA (S-ALOHA) protocol. S-ALOHA is a well-known MAC protocol and it has been studied widely in the literature (Roberts, 1975). Many papers have analyzed the stability and the performance of S-ALOHA with exponential back-off protocol (Silvester & J. A. Polydoros, 1995) (Hur, Kim, & Lee, 2005). A few papers have suggested using a linear back-off mechanism for particular networks (Vitsas, 2003) (Cho, Son, Pak, Son, & Han, 2004). Note that linear back-off protocol can create workload saturation and rapid reduction of system utilization in high contention scenarios; therefore the proposed protocols take the volume of traffic into account for setting the configuration parameters. Next both exponential and linear back-off protocols in the xMAX system are analyzed and the optimum configuration parameters are identified.

As explained before, in the current xMAX system every super-frame has a duration of 30 ms and contains 4 CBA slots. The maximum utilization of S-ALOHA (without retransmissions) has been analytically shown to be 1/e=0.36 (Silvester & J. A. Polydoros, 1995). However, in practice the maximum utilization for a random wireless multiple access system is around 0.30. Now, the existing analytical result on S-ALOHA to the back-off protocols in xMAX system is applied. The maximum number of successful CBAs per second (utilization of system) is equal to (1/0.030)*4*0.36=48.

Figure 5:
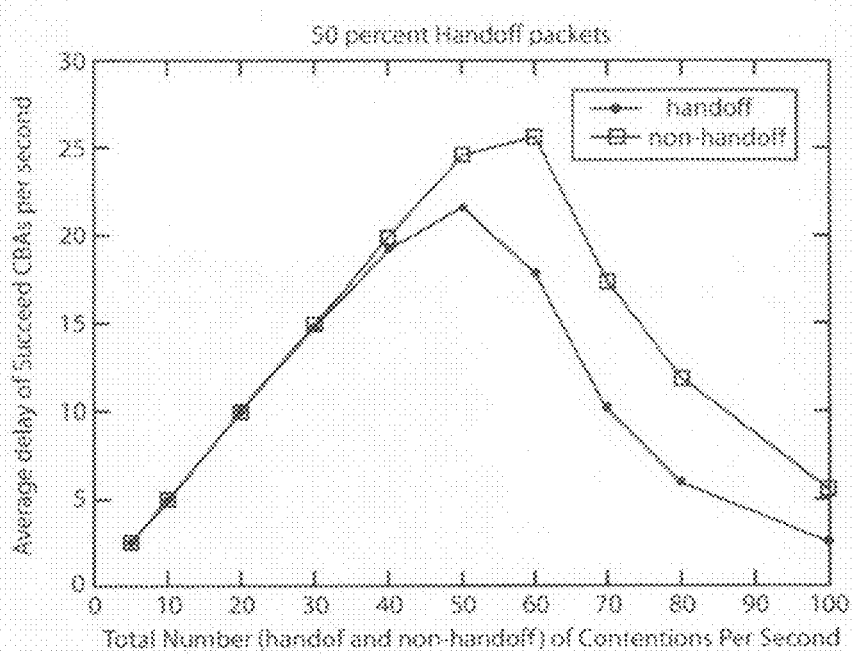
FIG. 5 is a diagram showing the use of exponential and linear back-off protocol.

Interestingly, the simulation results matches with this value as shown in FIG. 5. In addition, the simulation results exhibit that the maximum utilization point is slightly larger than the saturation point of the system. If the number of CBA requests goes beyond this point the channel utilization drops because the retransmissions will increase the chance of collision. We observe that the maximum utilization remains around 50 CBAs per second as the fraction of handoff CBAs varies in the system. This confirms that linear and exponential back-off protocol can work consistently with maximum utilization in a heterogeneous back-off protocol.

Simulation results for exponential and linear back-off protocols in the current xMAX design which has 4 CBA slots at each super-frame have now been provided in this disclosure. The results indicate that the current xMAX can support up to 40 CBA requests per second using heterogeneous back-off protocol where an arbitrary portion of the CBAs are handoffs. Note that increasing/reducing the number of CBA slots at each super-frame will expand/shrink the obtained performance curves proportionally in the x-axis (See FIGS. 2, 3, 4, 5). For example, if the number of CBA slots is reduced from 4 to 3 at each super-frame, then the saturation point varies from 40 to 40*3/4=30 CBAs per second.

Next the optimum configuration parameters for linear back-off protocol in the xMAX system are shown. As explained above there are two parameters in the protocol: (i) maximum number of trials (Max_trial); and, (ii) minimum contention window size (CW_min). Below the effect of each parameter on the performance of the xMAX system and identity of the optimum values for these parameters are disclosed.

The simulation results are shown for Max_trial=2, 4, and 8 in FIG. 6. Note that for Max_trial=2 the success rate drops quickly even with less than 20 handoffs per second (all CBA requests are handoffs). Only when the number of CBA requests is very large (70 to 100 CBAs per second) does it have a relatively better success rate, because, it uses less number of transmissions and creates less collisions. For Max_trial=8, the success rate is very high for less than 40 CBAs per second, but beyond this point the success rate drops very rapidly, and the average delay increases to 250 ms. These two simulation results indicate that 4 is a good choice for the maximum number of trials in xMAX system; because, it has relatively high success rate and low average delay compared to other smaller and larger values.

Next the effect of the minimum contention window size on the performance of linear back-off protocol is disclosed. FIG. 7 shows the performance of xMAX system for CW_min=2, 4, and 8.

The results indicate that the minimum contention windows size does not have much effect on the success rate. However, the average delay increases linearly with this parameter. The results suggest that CW_min=4 is a suitable choice.

Next is disclosed another simulation to investigate whether CW_min=4 is a proper value for the xMAX system. The histogram of the number of transmissions of succeed handoff and non-handoff CBAs at the saturation point (40 CBAs per second) is computed and shown in FIG. 8. The results reveal that even at the saturation point more than 60% of CBAs are successfully sent in the first trial for both handoff and non-handoff CBAs. This confirms that CW_min=4 is large enough to transmit most CBAs with a small number of trials.

The table below summarizes all the parameters to be used in the heterogeneous back-off mechanism. Based on the simulation results it can be concluded that the proposed system will handle 20 CBA messages per second and the average latency for handoff messages will be about 0.05 seconds.

| Message Type | CW_min | CW_max | Max_trial | Back-off Method |
|---|---|---|---|---|
| Handoff | 4 | 16 | 4 | Linear |
| Non-Handoff | 8 | 256 | 8 | Exponential |

When the number of CBA requests in a second is limited to 20 then the proposed method can deliver the packets with 100% success rate. To restate, the blocking probability of CBA requests is close to zero when the number of requests is less than 20 per second. If the number of requests is between 20-40 per second then the disclosed method can deliver the CBA packets with 96% success rate (refer to FIG. 4). Note that even at a CBA capacity of 20 requests per second the system is over-provisioned. The following reasoning in support of the above claim is provided: In a best case scenario one might be able to support 20 concurrent VOIP calls in each channel. If a base station receives more than 20 connection-establish or handoff requests then the requests in excess of 20 will be turned down. Assuming, each call lasts more than few seconds (even though the average duration of a call can be between 3-5 minutes) the system is limited more by the number of connection establish and handoff requests it can service than the capacity of CBA.

In this disclosure a linear back-off protocol for delivering delay intolerant packets such as handoff CBAs is proposed. The performance of both the existing exponential back-off and the proposed linear back-off protocols in xMAX system was discussed. The simulation results indicated that linear back-off can keep the transmit latency very short while exponential back-off can provide a higher rate of successful transmissions. It is therefore concluded that a heterogeneous back-off mechanism that uses the best of these two protocols i.e. linear back-off for handoff CBAs and exponential back-off for non-handoff CBAs is appropriate for the xMAX network, especially when using the identified optimum configuration parameters for the xMAX system.

What is claimed is:
1. A method using a medium access control protocol that combines contention-free and contention-based medium access control protocols into a heterogeneous medium access control protocol used for forwarding Internet Protocol packets containing voice traffic, signaling traffic, and application data traffic between a base station and mobile nodes in a voice over internet protocol system on a wireless network comprising:

- A base station in electrical communication with the Internet;
- one or more mobile nodes in wireless electrical communication with said base station;
- said base station and said one or more mobile nodes each having said medium access control protocol;
- wherein first, said medium access control protocol having super-frames of equal intervals of time;
- then each of said super-frames being divided into an initial time for contention-free timeslot based access voice traffic and a remainder time for contention-based access signaling traffic and application data traffic;
- then said base station dynamically determining a time duration of said initial time for contention-free timeslot based access based on a packetization interval determined by the duration of the voice traffic in said Internet Protocol packets;
- then said initial time for contention-free timeslot based access being divided into a control data timeslot, a downlink timeslot, and an uplink timeslot wherein the control data timeslot contains information regarding a current super-frame of said super-frames and said one or more mobile nodes receiving said information during said control data timeslot in each of said super-frames;
- then said contention-based access also containing control messages transmitted between said base station and said one or more mobile nodes when said one or more mobile nodes join or leave the wireless network or initiate a voice session that are latency tolerant contention-based access messages, and containing control messages transmitted between said base station and said one or more mobile nodes when said one or more mobile nodes hand-off to a different base station that are latency intolerant contention-based access messages; and,
- wherein said one or more mobile nodes then uses carrier sense multiple access with collision avoidance with exponential back off for said latency tolerant contention-based access messages and linear back-off for said latency intolerant contention-based access hand-off messages.

* * * * *